(12) United States Patent
Gulati et al.

(10) Patent No.: US 12,218,749 B2
(45) Date of Patent: Feb. 4, 2025

(54) SELECTION OF MODULATION AND CODING SCHEMES FOR CONTROL INFORMATION MULTIPLEXED WITH DATA

(71) Applicant: QUALCOMM Incorporated, San Diego, CA (US)

(72) Inventors: Kapil Gulati, Montgomery, NJ (US); Sudhir Kumar Baghel, Hillsborough, NJ (US); Gabi Sarkis, San Diego, CA (US); Junyi Li, Chester, NJ (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/061,080

(22) Filed: Oct. 1, 2020

(65) Prior Publication Data

US 2021/0105084 A1 Apr. 8, 2021

Related U.S. Application Data

(60) Provisional application No. 62/909,702, filed on Oct. 2, 2019.

(51) Int. Cl.
*H04L 1/00* (2006.01)
*H04L 27/20* (2006.01)
*H04W 28/02* (2009.01)

(52) U.S. Cl.
CPC .......... *H04L 1/0004* (2013.01); *H04L 1/0026* (2013.01); *H04L 27/2071* (2013.01); *H04L 1/0017* (2013.01); *H04W 28/0268* (2013.01)

(58) Field of Classification Search
CPC . H04L 1/0017; H04L 1/0004; H04L 27/2071; H04L 1/0003; H04L 1/0026;
(Continued)

(56) References Cited

U.S. PATENT DOCUMENTS

| 8,432,866 B1* | 4/2013 | Tapaninen | H04L 1/20 |
| | | | 370/252 |
| 2009/0227278 A1* | 9/2009 | Cho | H04L 1/0028 |
| | | | 455/522 |

(Continued)

FOREIGN PATENT DOCUMENTS

| EP | 2086153 A2 | 8/2009 |
| EP | 2129030 A1 | 12/2009 |

(Continued)

OTHER PUBLICATIONS

International Search Report and Written Opinion—PCT/US2020/054101—ISA/EPO—Jan. 13, 2021.

*Primary Examiner* — Oussama Roudani

(74) *Attorney, Agent, or Firm* — Arent Fox, LLP

(57) ABSTRACT

The present disclosure addresses selection of a modulation and coding scheme (MCS) for control information multiplexed on a data channel. A spectral efficiency associated with control information may be derived as a function of a spectral efficiency associated with data. A modulation order and/or code rate may be selected that is suitable for the spectral efficiency associated with the data. In an aspect of the disclosure, a method, a computer-readable medium, and an apparatus are provided. The apparatus may be configured to determine a first MCS for control information based on spectral efficiency associated with transmission of data, and further configured to transmit the control information with the first MCS, the control information being multiplexed with data.

30 Claims, 6 Drawing Sheets

(58) Field of Classification Search
CPC .. H04L 1/0073; H04L 1/007; H04W 28/0268; H04W 72/0453; H04W 72/23
See application file for complete search history.

(56) References Cited

U.S. PATENT DOCUMENTS

| | | |
|---|---|---|
| 2011/0228863 A1 | 9/2011 | Papasakellariou et al. |
| 2011/0243103 A1* | 10/2011 | Kowalski ............... H04L 1/007 370/336 |
| 2011/0268058 A1 | 11/2011 | Hammarwall et al. |
| 2011/0268080 A1 | 11/2011 | Luo et al. |
| 2011/0274043 A1* | 11/2011 | Nam .................. H04L 5/0023 370/328 |
| 2012/0106408 A1* | 5/2012 | Papasakellariou ........ H04L 5/14 370/280 |
| 2012/0207052 A1* | 8/2012 | Papasakellariou .... H04L 1/0026 370/336 |
| 2013/0322276 A1* | 12/2013 | Pelletier ................ H04W 76/14 370/252 |
| 2014/0177585 A1* | 6/2014 | Jang ..................... H04L 5/0091 370/329 |
| 2018/0124863 A1* | 5/2018 | Hellgren ................ H04L 1/0003 |
| 2018/0167931 A1* | 6/2018 | Papasakellariou .... H04L 5/0053 |
| 2019/0097750 A1* | 3/2019 | Sandberg .............. H04L 1/0035 |
| 2019/0297580 A1 | 9/2019 | Huang et al. |
| 2019/0335457 A1* | 10/2019 | Peng ................... H04W 72/042 |
| 2020/0022144 A1* | 1/2020 | Papasakellariou .... H04W 72/23 |
| 2020/0052861 A1* | 2/2020 | Li ........................ H04L 1/0026 |
| 2020/0145069 A1* | 5/2020 | Ferrante ............... H04B 7/0608 |
| 2022/0060276 A1* | 2/2022 | Chen .................... H04L 1/1867 |

FOREIGN PATENT DOCUMENTS

| | | |
|---|---|---|
| WO | 2008057843 A2 | 5/2008 |
| WO | 2017014445 A1 | 1/2017 |

* cited by examiner

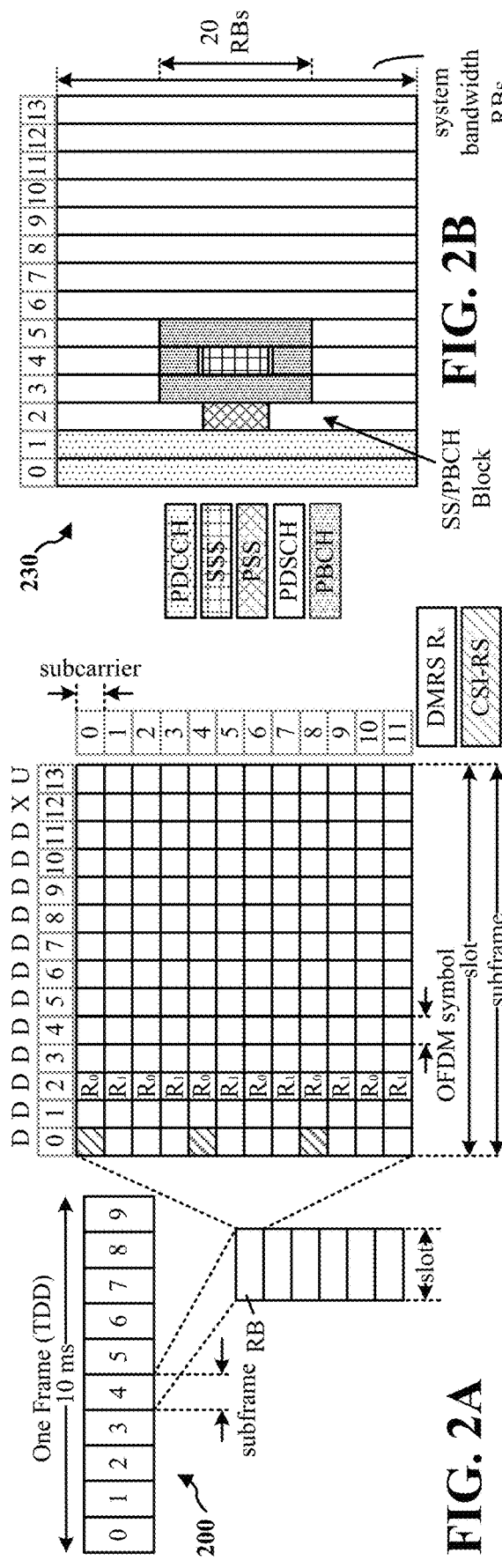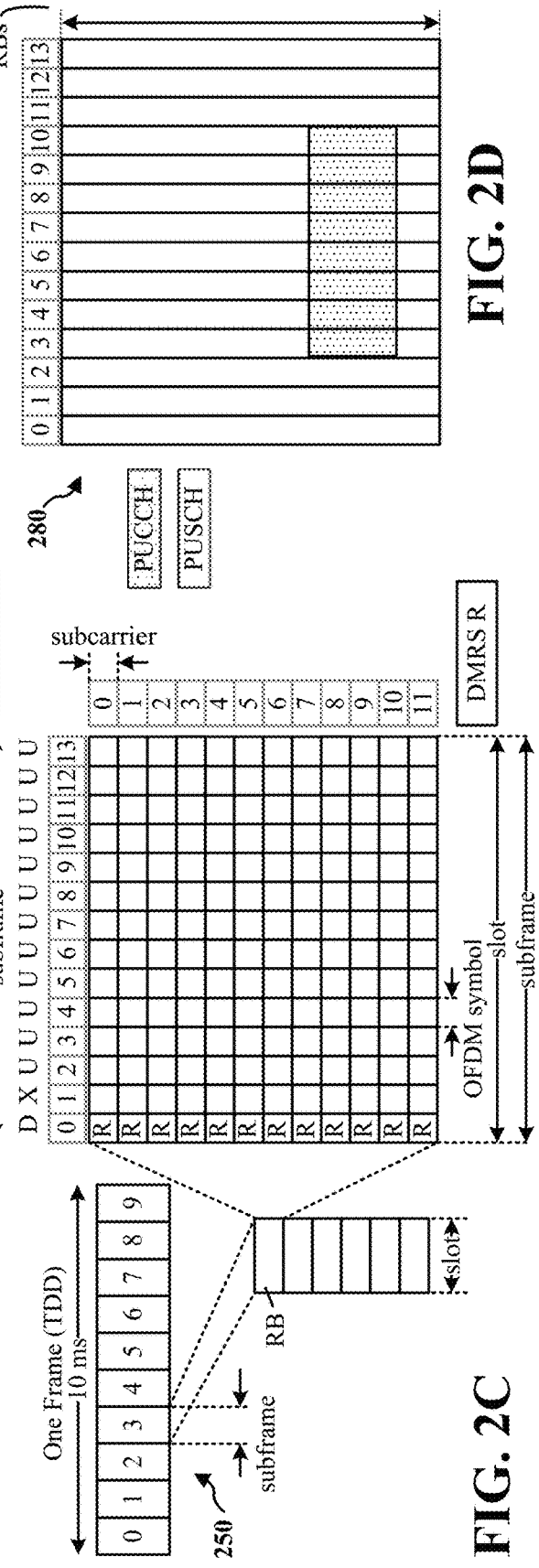
FIG. 2A
FIG. 2B
FIG. 2C
FIG. 2D

SELECTION OF MODULATION AND CODING SCHEMES FOR CONTROL INFORMATION MULTIPLEXED WITH DATA

CROSS REFERENCE TO RELATED APPLICATION(S)

This application claims the benefit of U.S. Provisional Application Ser. No. 62/909,702, entitled "SELECTION OF MODULATION AND CODING SCHEMES FOR CONTROL INFORMATION MULTIPLEXED WITH DATA" and filed on Oct. 2, 2019, the disclosure of which is expressly incorporated by reference herein in its entirety.

BACKGROUND

Technical Field

The present disclosure relates generally to communications systems, and more particularly, to a user equipment configured to determine a modulation and coding scheme for control information to be multiplexed with data for transmission.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

For example, some aspects of wireless communication include direct communication between devices, such as device-to-device (D2D), vehicle-to-everything (V2X), and the like. There exists a need for further improvements in such direct communication between devices. Improvements related to direct communication between devices may be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some example wireless and/or access networks, control information may be multiplexed on a data physical channel. In so doing, a modulation-and-coding scheme (MCS) with which the control information is transmitted may be dependent upon one or more conditions and/or parameters associated with the data to be multiplexed with the control information and/or the data physical channel on which the control information is to be multiplexed. However, the MCS selected for transmission of control information may be restricted to one or more values, which may be associated with the MCS selected for transmission of data.

In some aspects, control information may be expected to be more reliable and/or less error-prone than data, for example, because the control information may assist addressed and/or unaddressed receivers in interference cancellation, channel condition determination, etc., in addition to facilitating data reception by the intended or addressed receiver(s). For example, for sidelink channels, support for disproportional link budgets and/or data reliability may be desirable when control information is multiplexed on a sidelink physical data channel (e.g., for interference management using the control information).

In view of the foregoing, needs exist for improving reliability and/or reducing errors of control information multiplexed on a data channel. The present disclosure addresses such needs through techniques and approaches to selection of MCS for control information multiplexed on a data channel. Broadly, the present disclosure describes various aspects and implementation features of these techniques and approaches through derivation of spectral efficiency associated with control information as a function of spectral efficiency of data, as well as through determination of a modulation order and/or code rate that is suitable for that spectral efficiency.

Illustratively, the present disclosure describes some aspects of techniques and approaches to selection of MCS for control information multiplexed on a data channel through reference to sidelink communication. Sidelink channels may experience unequal link budgets and/or unequal error protection for control information and data, which may be beyond typical operating limits considered for uplink and/or downlink links.

In addition, some control information may facilitate interference management of sidelink channels and, therefore, such control information may be intended to reach receivers beyond the intended recipient(s) of data with which the control information may be multiplexed. For example, data may be sent to a group of receivers (e.g., groupcast) and, while reception of the data by the receivers of the group with some reliability may be desirable, reception of the control information by (unintended) receivers, which may be relatively more distant from the transmitter than the group, with some reliability may also be desirable (e.g., for management of distributed resource usage within the group of receivers).

In an aspect of the disclosure, a method, a computer-readable medium, and an apparatus are provided. The apparatus may be configured to determine a first modulation and coding scheme (MCS) for control information based on spectral efficiency associated with transmission of data, and further configured to transmit the control information with the first MCS, the control information being multiplexed with data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
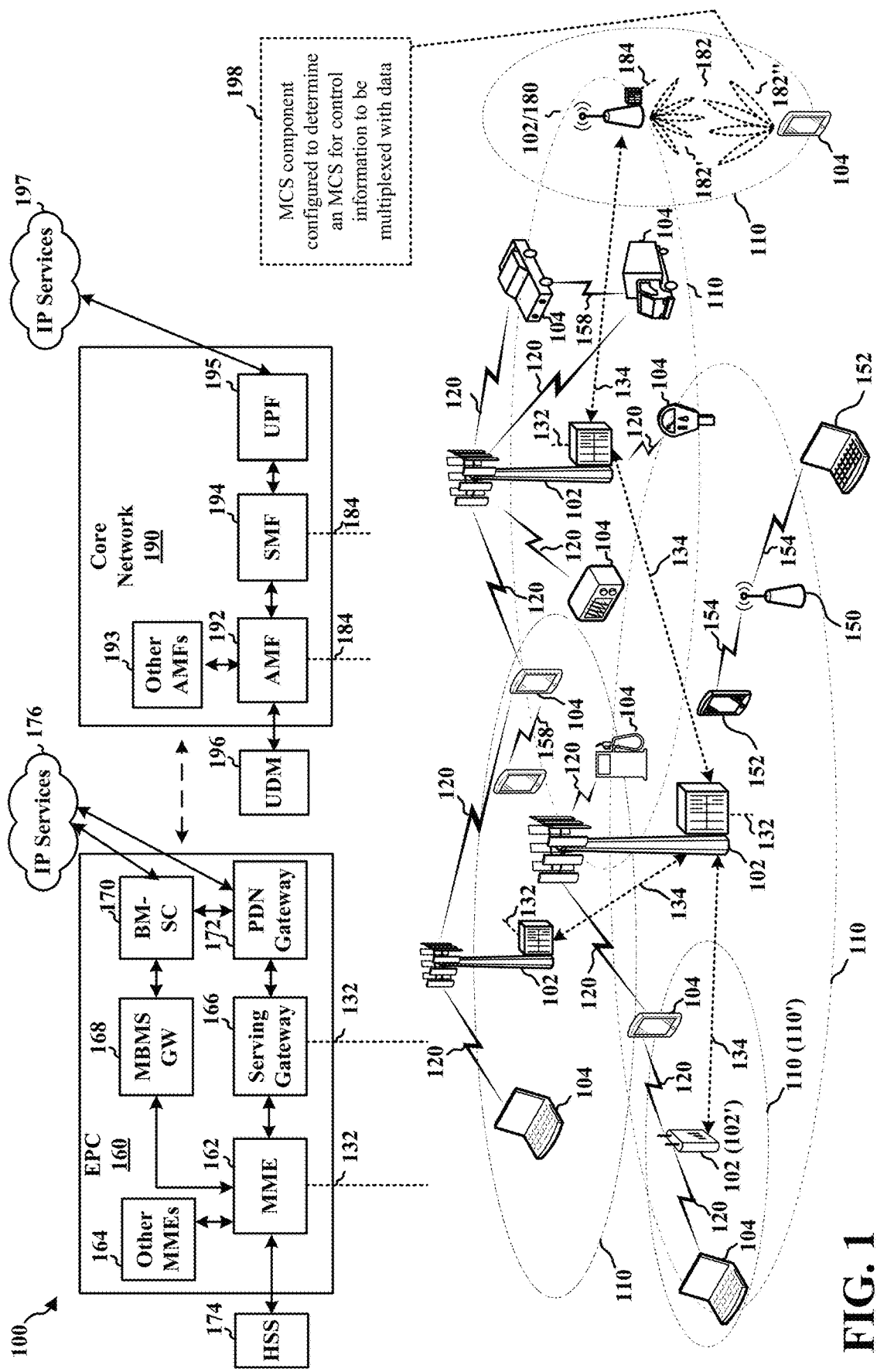
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), and/or other wireless and/or radio access technologies.

Further, although the present disclosure may describe some aspects in the context of vehicle-to-everything (V2X), the concepts and various aspects provided for herein may be applicable to other similar areas, such as D2D communication, IoT communication, Industrial IoT (IIoT) communication, and/or other standards/protocols for communication in wireless/access networks.

Referring again to FIG. 1, in certain aspects, the UE 104 may be configured to multiplex data with control information, for example, for transmission to a base station 102/180 and/or one or more other UEs. The UE 104 may determine at least one modulation and coding scheme (MCS) for the control information. Thus, according to various aspects, the UE 104 may include an MCS component 198, which may be configured to determine the MCS for the control information based on spectral efficiency associated with transmission of data.

Applying the configuration of the MCS component 198, the UE 104 may be configured to transmit the control information, multiplexed with data, with the determined MCS. The UE 104 may transmit the data, multiplexed with the control information, with an MCS that may be the same or different from the MCS determined for the control information.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
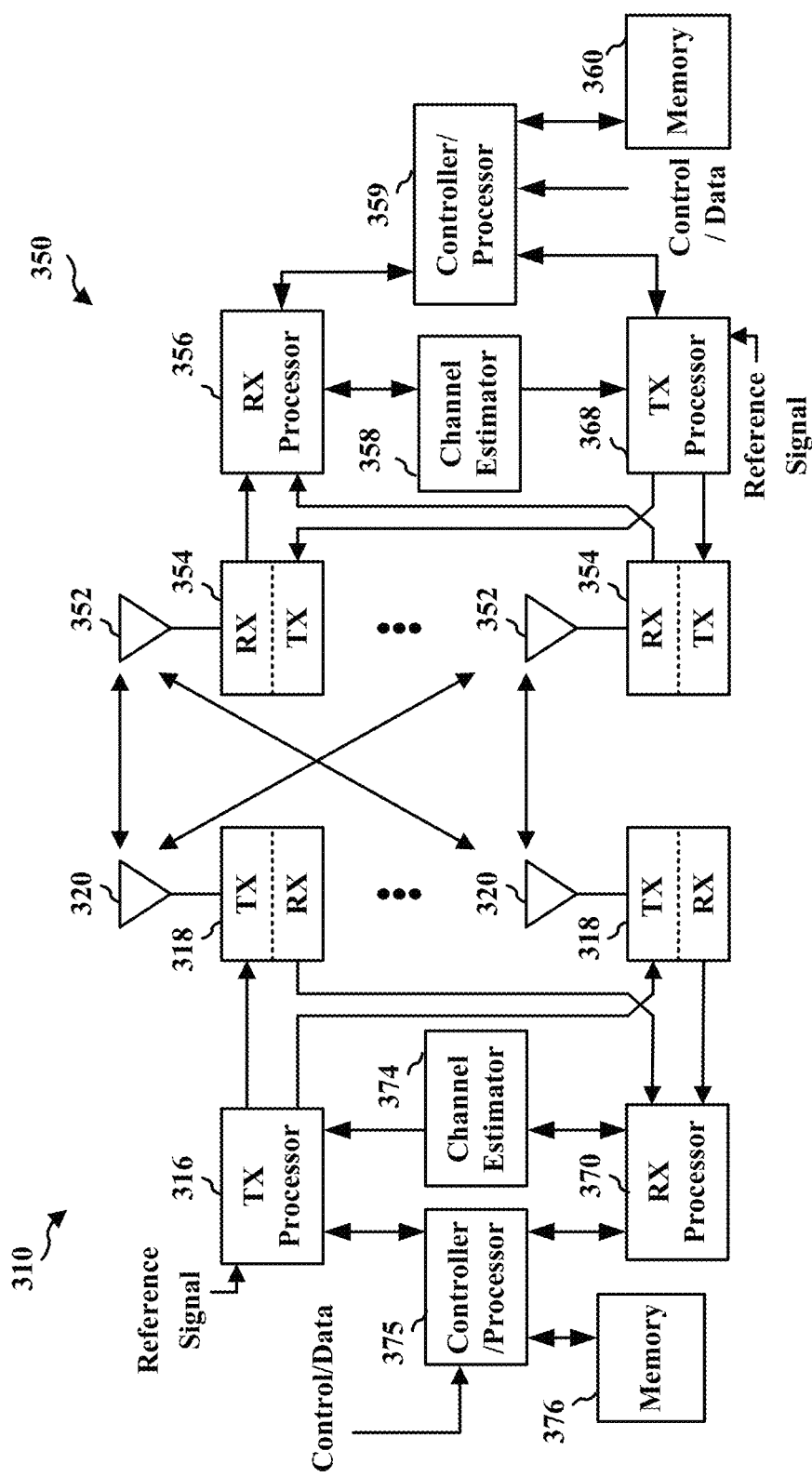
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the MCS component 198 of FIG. 1.

In various wireless communications systems, control information may be multiplexed with data on a physical channel. For example, UCI may be multiplexed with data on a PUSCH in LTE and 5G NR RANs. In another example applicable to at least 5G NR RANs, sidelink control stage 2 information may be multiplexed on a PSSCH, which may be a sidelink data physical channel (e.g., for D2D communication). In a further example applicable to at least 5G NR RANs, sidelink feedback control information (SFCI) may be multiplexed on the PSSCH (e.g., SFCI may include HARQ ACK/NACK, CQI, RI, PMI, etc.).

Illustratively, control information may include HARQ ACK/NACK information and/or feedback, CQI, RI, PMI, and/or other control information, which may facilitate, inter alia, data reception and/or interference cancellation by a receiving device (e.g., a base station or another UE). In some aspects, information bits of the control information may be independently encoded and then bit multiplexed with information bits of the data, the result of which may be processed (e.g., scrambled, modulated, etc.) using a data physical channel pipeline of a UE. In some other aspects, REs to which bits of the control information are assigned may be multiplexed with REs to which bits of the data are assigned, which may occur after processing the bits of both the control information and the data, for example, so that the control information may be transmitted with the same or a different MCS as that with which the data is transmitted.

As the control information may be multiplexed on a data physical channel, the MCS with which the control information is transmitted may be dependent upon one or more conditions and/or parameters associated with the data to be multiplexed with the control information and/or the data physical channel on which the control information is to be multiplexed. In some RANs (e.g., LTE), the MCS selected for transmission of control information may be restricted to one or more values, which may be associated with the MCS selected for transmission of data.

For example, in various LTE RANs, UCI may be multiplexed on the PUSCH and, correspondingly, the MCS selected for the control information may be set to the same as that selected for the data. In a second example, the UCI multiplexed on the PUSCH may be mapped to the outermost constellation points of a higher-order QAM modulation associated with data transmission on the PUSCH. The foregoing second example may, in effect, lead to QPSK but with a higher average power in the constellation points; the receiver may still assume demodulation according to higher-order modulation (e.g., same as the data) and, therefore, may discard the log-likelihood ratio (LLR) corresponding to the inner constellation points, which may effectively provide QPSK modulation. In a third example associated with 5G NR RANs, UCI may be multiplexed on the PUSCH, and may be transmitted using the same MCS as that selected for data on the PUSCH with which the UCI may be multiplexed.

In some wireless communications systems, control information may be expected to be more reliable and/or less error-prone than data, for example, because the control information may assist addressed and/or unaddressed receivers in interference cancellation, channel condition determination, etc., in addition to facilitating data reception by the intended or addressed receiver(s). For example, for sidelink channels, support for disproportional link budgets and/or data reliability may be desirable when control information is multiplexed on a sidelink physical data channel (e.g., for interference management using the control information).

In view of the foregoing, needs exist for improving reliability and/or reducing errors of control information multiplexed on a data channel. The present disclosure addresses such needs through techniques and approaches to selection of MCS for control information multiplexed on a data channel, e.g., as further detailed in FIGS. 4-6, infra. Broadly, the present disclosure describes various aspects and implementation features of these techniques and approaches through derivation of spectral efficiency associated with control information as a function of spectral efficiency of data, as well as through determination of a modulation order and/or code rate that is suitable for that spectral efficiency. For example, 16QAM code-rate ½ may provide better reliability than QPSK code rate 1 for a spectral efficiency of 2 bits per second (bps) per hertz (Hz) (bps/Hz)).

Illustratively, the present disclosure explicates some aspects of techniques and approaches to selection of MCS for control information multiplexed on a data channel through reference to sidelink communication (e.g., D2D, UE-to-UE, V2X, some IoT scenarios, etc.). Sidelink channels may experience unequal link budgets and/or unequal error protection for control information and data, which may be beyond typical operating limits considered for uplink and/or downlink links (e.g., UE-to-gNB, UE-to-base station, UE-to-small cell).

In addition, some control information may facilitate interference management of sidelink channels and, therefore, such control information may be intended to reach UE(s) beyond the UE(s) that is the intended recipient of the data with which the control information may be multiplexed. For example, different from UE-to-gNB links, data may be sent to a group of UEs (e.g., groupcast, which may include UE-to-UEs links) and, while reception of the data by the UEs of the group with some reliability may be desirable, reception of the control information by UEs that are relatively more distant from the transmitting UE than each of the group of UEs with some reliability may also be desirable (e.g., for management of distributed resource usage within the group of UEs).

Figure 4:
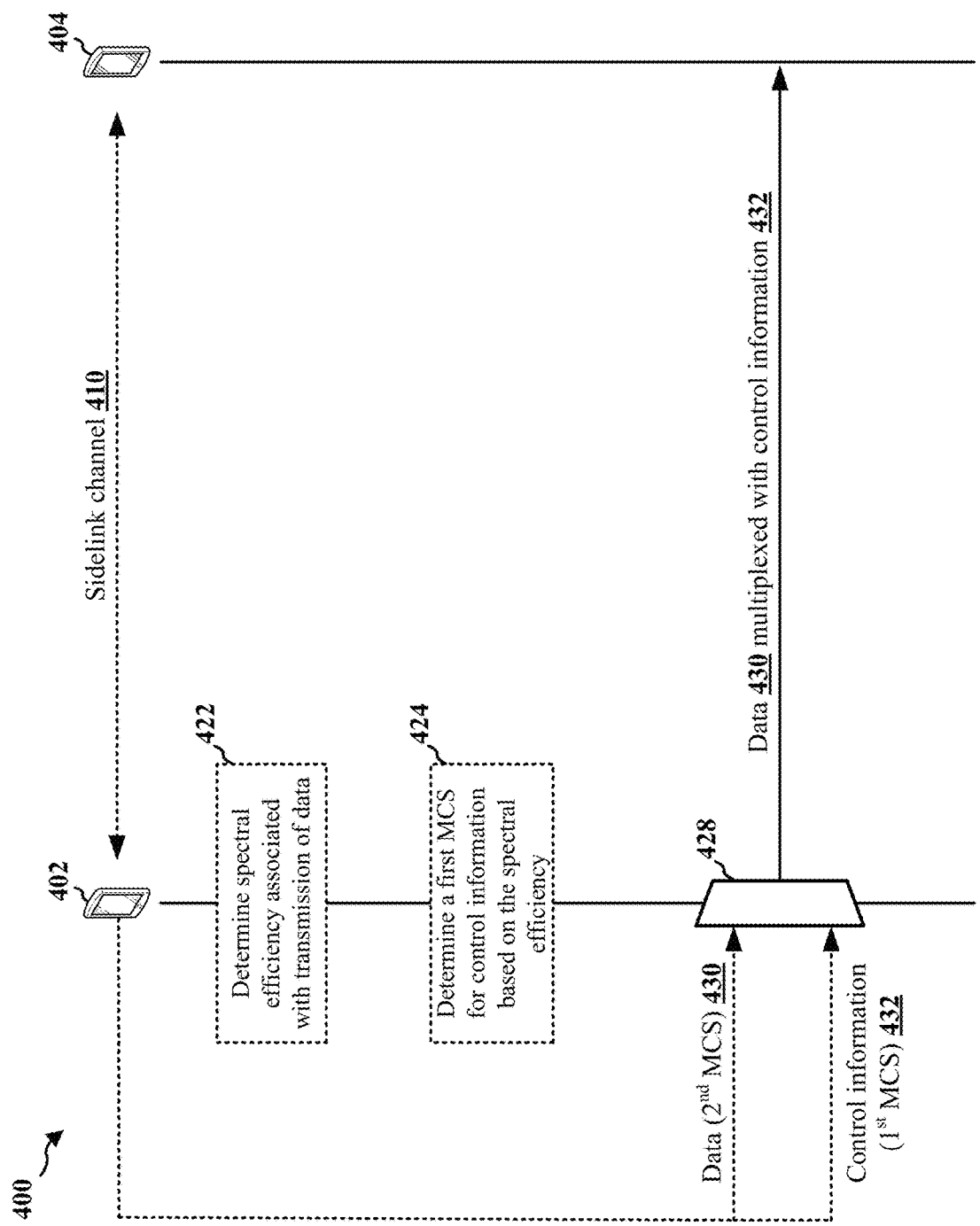
FIG. 4 is a call flow diagram illustrating a wireless communication environment.

FIG. 4 is a call flow diagram illustrating a wireless communications system 400 including at least two UEs 402, 404 configured for communication on a sidelink channel 410. In the context of the preceding FIG. 1 and FIG. 3, each of the UEs 402, 404 may be implemented as the UE 104 and/or the UE 350. The sidelink channel 410 may be a data channel, such as a PSSCH as described in the context of FIG. 1. While FIG. 4 may describe the concepts of the present disclosure in the context of the sidelink channel 410, the concepts of the present disclosure may be applicable to other channels (e.g., uplink and/or downlink channels), as well as other radio access and/or wireless technologies.

In the wireless communications system 400, control information configured to indicate data may be separated into two parts (e.g., as in 5G NR): a sidelink control channel stage-1 (CCH-1) and a sidelink control channel stage-2 (CCH-2). CCH-1 may indicate CCH-2, whereas CCH-2 may indicate data. In other words, CCH-1 may include first control information so that CCH-2 may be received and decoded, and, once decoded, second control information of CCH-2 may facilitate reception and decoding of data. Specifically, CCH-1 may carry data resource reservation information (e.g., current and/or future resource schedule(s)), as well as information for decoding CCH-2 including MCS, TM, DMRS patterns, etc. CCH-1 may be intended for all UEs that are sufficiently proximate to the transmitting UE, and not just limited to the UE(s) that is the intended recipient of data. CCH-2 may include additional information for decoding SCH and further information specific to the type of communication (e.g., unicast, multicast, or broadcast), including source and destination IDs, HARQ ID, NDI, RV. CCH-2 may be intended for Rx UEs for which data is transmitted, such as a UE(s) addressed or indicated in the source ID. To that end, Table 1 and Tables 2-4 may describe the contents of CCH-1 and CCH-2, respectively.

TABLE 1

(CCH-1 information content; 51 total bits)

| Field | # of bits | Comments |
|---|---|---|
| # of slots | 3 | Indicates the number of slots for a corresponding transmission |
| Joint time/frequency resource reservation for retransmission | 9 | Time/frequency resources used by SCH + CCH-2, and additionally the future time/frequency resources being reserved for retransmission |
| Periodicity if same resource(s) reserved for future periodic transmission(s) | 4 | If periodic traffic |
| QoS (e.g., only priority) | 3 | Priority information |
| Control exclusion distance | 4 | Exclusion region to follow for reserved resources |
| CCH-2 format indicator + CCH-2/SCH rate offset | 4 | |
| DMRS pattern | 2 | Potentially greater number of bits if dynamic selection of Type 1 and Type 2 is supported |
| MCS | 5 | |
| Transmission mode (rank, layers: (a) single port, (b) rank-2, etc.) | 2 | |
| Cyclic Redundancy Check (CRC) | 24 | |

TABLE 2

(CCH-2 Format 1 (for broadcast) information content; 46 total bits)

| Field | # of bits | Comments |
|---|---|---|
| Layer-1 source ID | 8 | Note: Receiver UE(s) may perform HARQ combining based on source ID and destination ID (e.g., to determine same the same link), HARQ ID/NDI/RV |
| Layer-1 destination ID | 8 | |
| HARQ process ID | 3 | |
| New data indicator (NDI) | 1 | |
| Redundancy Version (RV) ID | 2 | |
| CRC | 24 | |

TABLE 3

(CCH-2 Format 2 (for multicast) information content; 62 total bits)

| Field | # of bits | Comments |
|---|---|---|
| Layer-1 source ID | 8 | Note: Receiver UE(s) may perform HARQ combining based on source ID and destination ID (e.g., to determine same the same link), HARQ ID/NDI/RV |
| Layer-1 destination ID | 8 | |
| HARQ process ID | 3 | |
| NDI | 1 | |
| RV ID | 2 | |
| Zone ID for distance-based NACK | 10 | Note: for multicast NACK functionality |
| NACK distance | 1 | |
| HARQ ACK/NACK feedback needed | 5 | |
| CRC | 24 | |

TABLE 4

(CCH-2 Format 3 (for unicast) information content; 53 total bits)

| Field | # of bits | Comments |
|---|---|---|
| Layer-1 source ID | 8 | Note: Receiver UE(s) may perform HARQ combining based on |
| Layer-1 destination ID | 8 | |
| HARQ process ID | 3 | |

TABLE 4-continued (CCH-2 Format 3 (for unicast) information content; 53 total bits)

| Field | # of bits | Comments |
|---|---|---|
| NDI | 1 | source ID and destination |
| RV ID | 2 | ID (e.g., to determine same the same link), HARQ ID/NDI/RV |
| HARQ ACK/NACK feedback needed | 1 | |
| CSI-RS configuration | 2 | |
| Open-loop power control (OLPC) reference Tx power | 4 | For OLPC |
| CRC | 24 | |

In the wireless communications system 400, a first UE 402 (e.g., a Tx UE) may be configured to determine a first MCS associated with transmission of control information based on spectral efficiency associated with transmission of data with which the control information is to be multiplexed. Accordingly, the first UE 402 may determine the spectral efficiency associated with data transmission (422). The first UE 402 may determine the spectral efficiency associated with data transmission (422) based on one or more of a number of information bits (e.g., of CCH-2 $I_{CCH}$ or of a data/shared channel $I_{SCH}$), a number of REs to be used for transmission N (e.g., a number of modulated symbols), a total number of REs available for transmission M, and/or a modulation order Q. In some aspects, the spectral efficiency associated with control information (e.g., CCH-2) may be derived based on the inverse of an offset $\beta$.

According to various aspects, Equation 1 and Equation 2 may illustrate derivation of spectral efficiency associated with transmission of control information (e.g., CCH-2) based on spectral efficiency associated with data. In Equations 1 and 2, infra, subscript CCH may indicate a variable associated with control information (e.g., CCH-2) and subscript SCH may indicate a variable associated with a data and/or shared channel (e.g., sidelink channel 410) on which the control information is to be multiplexed.

$$\frac{I_{CCH}}{N_{CCH}} = \frac{1}{\beta} \frac{I_{SCH}}{(M - N_{CCH})} \qquad \text{Equation 1}$$

$$N_{CCH} = \frac{\beta I_{CCH} M}{(I_{SCH} + I_{CCH}\beta)} \approx \frac{\beta I_{CCH} M}{I_{SCH}} \qquad \text{Equation 2}$$

In some aspects, the modulation order of the shared/data channel (e.g., sidelink channel 410) $Q_{SCH}$ may be different from the modulation order of the control information $Q_{CCH}$. In order to enforce the inequality $Q_{SCH} \neq Q_{CCH}$, the maximum code rate given a modulation order may be constrained, e.g., so that the maximum code rate cannot exceed $R_{MAX}$, which may be 0.94 in some aspects. According to such a constraint, the number of REs to be used for transmission of the control information $N_{CCH}$ may be constrained according to the maximum of two functions shown in Equation 3, infra.

$$N_{CCH} = \max\left\{\frac{\beta I_{CCH} M}{I_{SCH}}, \frac{I_{CCH}}{R_{max} Q_{CCH}}\right\} \qquad \text{Equation 3}$$

The foregoing constraint illustrated in Equation 3 may be imposed if the modulation order for the control information $Q_{CCH}$ is fixed to a given modulation, such as when CCH modulation is fixed to QPSK for reliability reasons. However, the maximum code rate may not necessarily be constrained in all aspects. For example, in 5G NR, UCI on the PUSCH may be unconstrained, as the modulation order for the control information $Q_{CCH}$ may be equal to the modulation order for the data/shared channel $Q_{SCH}$ such that a code rate less than 1 is guaranteed.

In some further aspects, the maximum fraction of REs to be used by bits of the control information may be limited to a fraction $\alpha$ of the total number of REs available for transmission M. For example, the number of REs to be used for transmission of the control information $N_{CCH}$ may be limited to the minimum of two functions shown in Equation 4, infra.

$$N_{CCH} = \min\left\{\max\left\{\frac{\beta I_{CCH} M}{I_{SCH}}, \frac{I_{CCH}}{R_{max} Q_{CCH}}\right\}, \alpha M\right\} \qquad \text{Equation 4}$$

For Equations 1-4, supra, the first UE 402 may be configured to determine the offset $\beta$ when deriving the spectral efficiency associated with control information as a function of the spectral efficiency associated with the data/shared channel on which the control information is to be multiplexed. In one aspect, the first UE 402 may determine the offset $\beta$ based on preconfigured information (e.g., the offset $\beta$ may be fixed or non-configurable in memory of the first UE 402)—e.g., the offset $\beta$ may be defined in a standard or technical specification promulgated by 3GPP or other standards-governing organization. In another aspect, the first UE 402 may determine the offset $\beta$ based on implementation design of the first UE 402, although the first UE 402 may be configured to determine the offset $\beta$ to adhere to one or more parameters (e.g., one or more preconfigured limits)—e.g., one or more parameters defined in a standard or technical specification promulgated by 3GPP or other standards-governing organization. In yet another aspect, the first UE 402 may determine the offset $\beta$ and/or a set of potential values for the offset $\beta$ based on one or more of the type of data with which the control information is to be multiplexed (e.g., unicast, multicast, or broadcast), a priority associated with the data, and/or QoS parameter(s) associated with the data—e.g., correspondence between the offset $\beta$ and one or more of the type of data, the priority of the data, and/or the QoS parameters associated with the data may be defined in a standard or technical specification promulgated by 3GPP or other standards-governing organization.

Based on the spectral efficiency associated with data transmission (422), the first UE 402 may determine at least a first MCS for the control information (424). For example, the first UE 402 may determine the first MCS for the control information (424) based on one or more of an upper limit on a maximum coding rate, a modulation order, or a number of information bits associated with transmission of the control information 432.

In a first aspect, the first UE 402 may determine the first MCS to be equal to that of a second MCS associated with transmission of the data with which the control information is to be multiplexed. For example, the first UE 402 may determine the second MCS based on the spectral efficiency associated with data transmission (422) and, correspondingly, the first UE 402 may determine the first MCS to be equal to the second MCS. According to the first aspect, the determination of the first MCS for the control information (424) by the first UE 402 may be similar to that of the determination of an MCS for UCI to be multiplexed on the PUSCH in 5G NR.

In a second aspect, the first UE 402 may determine the first MCS for the control information (424) based on the spectral efficiency associated with the control information (e.g., CCH-2) derived as a function of the spectral efficiency associated with data transmission. For example, the first UE 402 may determine the first MCS to be suitable (e.g., optimal) for the spectral efficiency associated with the control information (e.g., CCH-2). To do so, the first UE 402 may be configured with mapping and/or other information indicating correspondence between a determined spectral efficiency and an MCS, which may be implemented in the first UE 402 as a selection or lookup table (e.g., a preconfigured table(s) stored in the first UE 402). Thus, when the first UE 402 determines a value of the spectral efficiency associated with the control information, the first UE 402 may access a table to determine an MCS that is indicated as corresponding to the determined value of the spectral efficiency associated with the control information.

Further to the aforementioned second aspect, as reliability and/or QoS conditions associated with the data may vary, the first UE 402 may determine the first MCS for the control information (424) based on the spectral efficiency associated with the control information and based on one or more of the type of data with which the control information is to be multiplexed (e.g., unicast, multicast, or broadcast), a priority associated with the data, and/or QoS parameter(s) associated with the data. For example, the first UE 402 may be configured with mapping and/or other information indicating an MCS that corresponds to a combination of the determined spectral efficiency associated with the control information and one or more of one or more of the type of data with which the control information is to be multiplexed (e.g., unicast, multicast, or broadcast), a priority associated with the data, and/or QoS parameter(s) associated with the data.

In a third aspect, the first UE 402 may be configured to determine the first MCS for the control information (424) based on fixed or preconfigured information. For example, the first UE 402 may separately determine the modulation order and the code rate associated with the first MCS, and the modulation order may be fixed or preconfigured whereas the first UE 402 may determine the code rate for the first MCS (e.g., based on the spectral efficiency, as described herein). For example, the first UE 402 may determine that the first MCS for the control information (424) is fixed to a given modulation, such as QPSK. Additionally or alternatively, the first UE 402 may determine the first MCS for the control information (424) as a function of one or more of the type of data with which the control information is to be multiplexed (e.g., unicast, multicast, or broadcast), a priority associated with the data, and/or QoS parameter(s) associated with the data. For example, the first UE 402 may be preconfigured with information indicating that unicast data corresponds to one MCS, whereas multicast data corresponds to another MCS.

In addition to determining the first MCS for the control information 432, the first UE 402 may be configured to determine a second MCS for the data 430. For example, the first UE 402 may determine the second MCS based on the spectral efficiency associated with transmission of the data 430. The first UE 402 may determine the first MCS to be different from or equal to the second MCS.

The first UE 402 may multiplex 428 the data 430, to be transmitted with the second MCS, with the control information 432 (e.g., CCH-2), to be transmitted with the first MCS. In one aspect, the first UE 402 may multiplex 428 the data 430 with the control information 432 using bit multiplexing on the sidelink channel 410. In another aspect, the first UE 402 may multiplex 428 the data 430 with the control information 432 by multiplexing REs assigned to the data 430 on the sidelink channel 410 with REs assigned to the control information 432 on the sidelink channel 410.

Subsequently, the first UE 402 may transmit the data 430 multiplexed with the control information 432 on the sidelink channel 410, so that the data 430 may be transmitted using the second MCS while the control information 432 (e.g., CCH-2) may be transmitted using the aforementioned determined first MCS. In some aspects, the first UE 402 may indicate the offset $\beta$ in other control information (e.g., CCH-1) that facilitates reception and/or decoding of the control information 432 (e.g., CCH-2).

The first UE 402 may transmit the multiplexed data 430 and control information 432 to the second UE 404, which may be an intended recipient of the data 430 or may not be an intended recipient of the data 430 but within range of the first UE 402. The second UE 404 may receive at least the control information 432, which may be more reliable and/or less error-prone than the data 430 with which the control information 432 is multiplexed.

Figure 5:
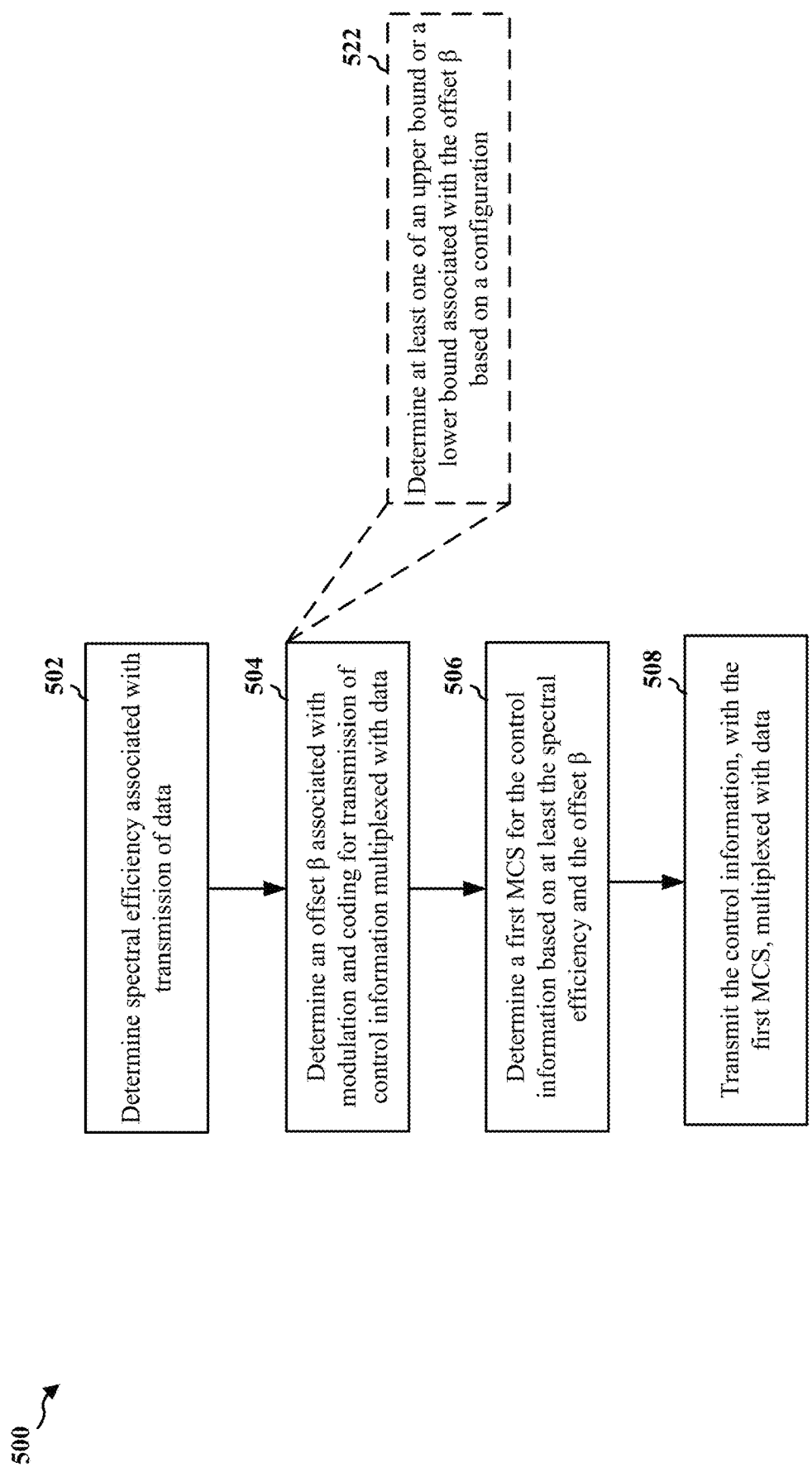
FIG. 5 is a flowchart of a method of wireless communication.

FIG. 5 is a flowchart of a method 500 of wireless communication. The method 500 may be performed by a UE (e.g., the UE 104, the UE 350, the first UE 402) and/or an apparatus (e.g., the apparatus 602 or another apparatus that may include the memory 360 and that may be the entire UE 350 or a component of the UE 350, such as the TX processor 368, the RX processor 356, and/or the controller/processor 359). According to different aspects, one or more of the illustrated operations of the method 500 may be transposed, omitted, and/or contemporaneously performed.

Beginning with operation 502, the UE may determine spectral efficiency associated with transmission of data. The UE may determine the spectral efficiency associated with the transmission of data based on one or more of a number of information bits I (e.g., of CCH-2 $I_{CCH}$ or of a data/shared channel $I_{SCH}$), a number of REs to be used for transmission N (e.g., a number of modulated symbols), a total number of REs available for transmission M, and/or a modulation order Q. The UE may determine spectral efficiency associated with transmission of control information (e.g., CCH-2) to be multiplexed with the data as a function of the spectral efficiency determined for the data transmission. By way of illustration, For example, referring to FIG. 4, the first UE 402 may determine spectral efficiency associated with transmission of data (422).

At operation 504, the UE may determine an offset $\beta$ associated with modulation and coding for transmission of control information to be multiplexed with the data. The control information may be CCH-2, and may be multiplexed onto a data and/or shared channel (e.g., a PSSCH). The UE may determine the offset $\beta$ based on one or more of a type of data with which the control information is to be multiplexed (e.g., unicast, multicast, or broadcast), a priority associated with the data, and/or QoS parameter(s) associated with the data. For example, referring to FIG. 4, the first UE 402 may determine the offset $\beta$, e.g., based on one or more of the type of data 430 with which the control information 432 is to be multiplexed (e.g., unicast, multicast, or broadcast), a priority associated with the data 430, and/or QoS parameter(s) associated with the data 430.

In some aspects, the UE may perform operation 522. At operation 522, the UE may determine at least one of an upper bound and/or a lower bound associated with the offset β. The UE may determine the at least one of the upper bound and/or the lower bound based on a configuration, which may be received (e.g., from the network or another UE) or may be preconfigured in memory of the UE. The UE may determine the offset β (operation 504) to be within the at least one of the upper bound and/or the lower bound (e.g., including the at least one of the upper bound and/or the lower bound). For example, referring to FIG. 4, the first UE 402 may determine at least one of an upper bound and/or a lower bound associated with the offset β, and the UE 402 may determine the offset β to be inclusively within the determined at least one of the upper bound and/or lower bound.

At operation 506, the UE may determine a first MCS for the control information based on at least the determined spectral efficiency and the determined offset β. For example, the UE may determine the first MCS for the control information based on at least one of information indicating correspondence between the determined spectral efficiency and the first MCS, the type of the data multiplexed with the control information for the transmission, the priority of the data, one or more QoS parameters associated with the data, and/or a second MCS with which the data is transmitted. In some aspects, the second MCS is different from the first MCS. For example, referring to FIG. 4, the first UE 402 may determine the first MCS for the control information 432 based on the spectral efficiency associated with transmission of the data 430 (424).

At operation 508, the UE may transmit the control information with the first MCS multiplexed on a data or shared channel with the data. The data may be transmitted with the second MCS. The UE may multiplex bits or may multiplex REs of the control information and the data on the data or shared channel. In some aspects, the number of REs on which the control information is transmitted may be limited based on a fraction α of the total number of REs available for transmission of the multiplexed data and control information. For example, referring to FIG. 4, the first UE 402 may transmit the control information 432 (e.g., CCH-2) with the first MCS multiplexed 428 on the sidelink channel 410 with the data 430, which may be transmitted with the second MCS.

Figure 6:
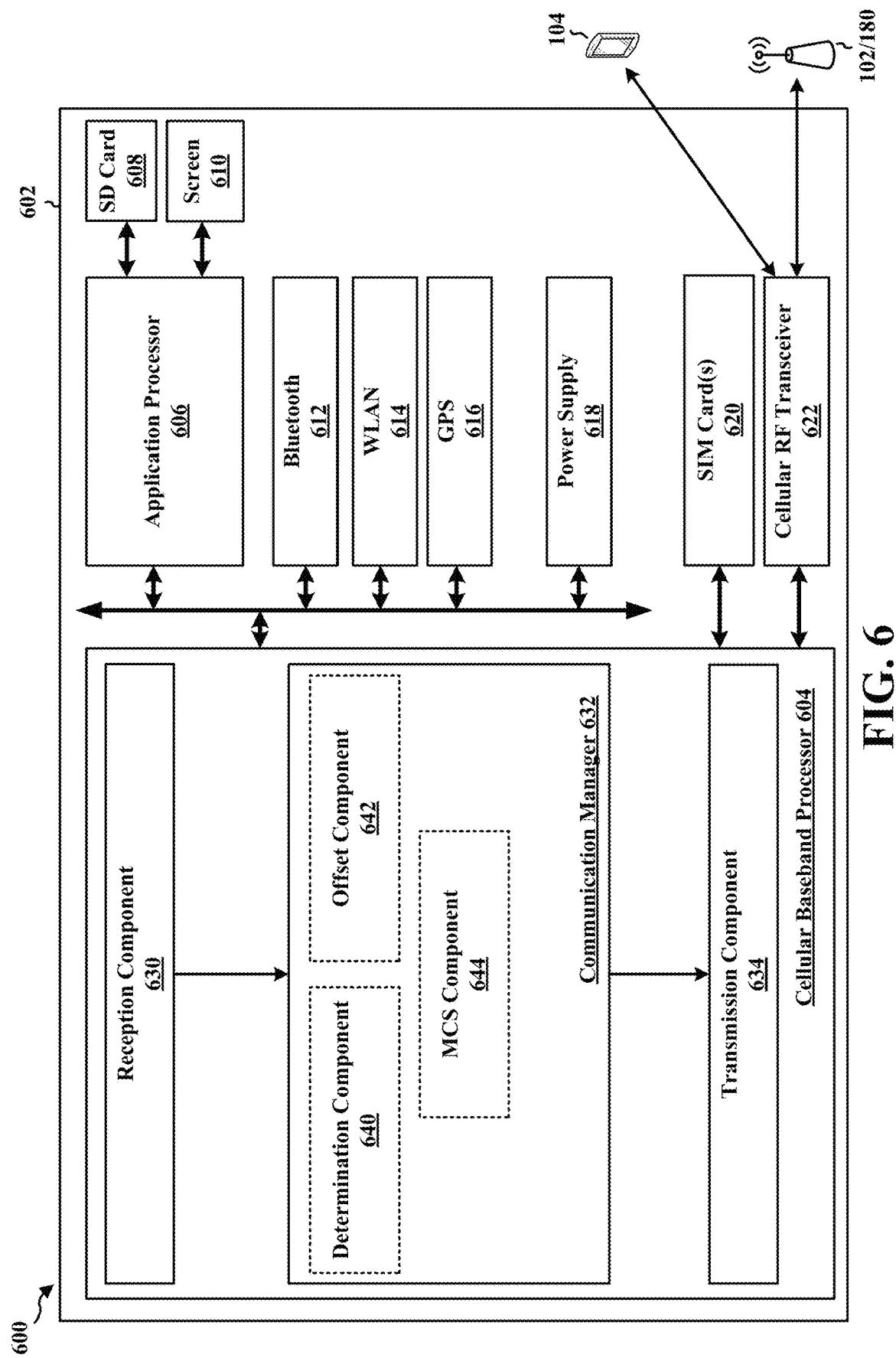
FIG. 6 is a diagram illustrating an example of a hardware implementation for an example apparatus.

FIG. 6 is a diagram 600 illustrating an example of a hardware implementation for an apparatus 602. The apparatus 602 is a UE and includes a cellular baseband processor 604 (also referred to as a modem) coupled to a cellular RF transceiver 622 and one or more subscriber identity modules (SIM) cards 620, an application processor 606 coupled to a secure digital (SD) card 608 and a screen 610, a Bluetooth module 612, a wireless local area network (WLAN) module 614, a Global Positioning System (GPS) module 616, and a power supply 618. The cellular baseband processor 604 communicates through the cellular RF transceiver 622 with the UE 104 and/or BS 102/180. The cellular baseband processor 604 may include a computer-readable medium/memory. The computer-readable medium/memory may be non-transitory. The cellular baseband processor 604 is responsible for general processing, including the execution of software stored on the computer-readable medium/memory.

The software, when executed by the cellular baseband processor 604, causes the cellular baseband processor 604 to perform the various functions described supra. The computer-readable medium/memory may also be used for storing data that is manipulated by the cellular baseband processor 604 when executing software. The cellular baseband processor 604 further includes a reception component 630, a communication manager 632, and a transmission component 634.

The communication manager 632 includes the one or more illustrated components 640, 642, 644. The components 640, 642, 644 within the communication manager 632 may be stored in the computer-readable medium/memory and/or configured as hardware within the cellular baseband processor 604. The cellular baseband processor 604 may be a component of the UE 350 and may include the memory 360 and/or at least one of the TX processor 368, the RX processor 356, and the controller/processor 359. In one configuration, the apparatus 602 may be a modem chip and include just the baseband processor 604, and in another configuration, the apparatus 602 may be the entire UE (e.g., see 350 of FIG. 3) and include the aforediscussed additional modules of the apparatus 602.

The communication manager 632 includes a determination component 640 that is configured to determine spectral efficiency associated with transmission of data, e.g., as described in connection with operation 502 of FIG. 5. For example, the determination component 640 may determine the spectral efficiency associated with the transmission of data based on one or more of a number of information bits, a number of resource elements to be used for transmission of data multiplexed with control information, a total number of resource elements available for the transmission, or a modulation order associated with the transmission.

The communication manager 632 includes an offset component 642 that is configured to determine an offset β associated with modulation and coding for transmission of control information multiplexed with data, e.g., as described in connection with operation 504 of FIG. 5. In some aspects, the offset β is preconfigured in memory of the apparatus 602. In some other aspects, the offset β is determined based on at least one of a type of the data multiplexed with the control information for the transmission, a priority of the data, or a QoS parameter associated with the data.

The offset component 642 may be further configured to determine at least one of an upper bound or a lower bound associated with the offset β based on a configuration, e.g., as described in connection with operation 522 of FIG. 5. The offset component 642 may determine the offset β to be inclusively within the at least one of the upper bound or the lower bound.

The communication manager 632 further includes an MCS component 644 that receives input in the form of spectral efficiency from the determination component 640 and in the form of the offset β from the offset component 642, and the MCS component 644 is configured to determine a first MCS for the control information based on at least the spectral efficiency and the offset β, e.g., as described in connection with operation 506 of FIG. 5.

In some aspects, the first MCS is determined based on one or more of an upper limit on a maximum coding rate, a modulation order, or a number of information bits associated with the transmission.

In some other aspects, the first MCS is determined based on at least one of information indicating correspondence between the spectral efficiency and the first MCS, a type of the data multiplexed with the control information for the transmission, a priority of the data, a QoS parameter associated with the data, and/or a second MCS with which the data is to be transmitted.

In further aspects, the first MCS may be determined to be different from the second MCS with which the data is to be transmitted. Is still other aspects, a modulation order associated with the first MCS is fixed to QPSK.

The MCS component 644 configures the transmission component 634 with the determined first MCS, with which the control information is to be transmitted, and the second MCS with which the data is to be transmitted. The transmission component 634 transmits the control information with the first MCS, the control information being multiplexed with the data. For example, the transmission component 634 may transmit the control information with the first MCS and the data with the second MCS, the control information being multiplexed with the data, to the UE 104, e.g., on a sidelink channel. In some aspects, a number of resource elements on which the control information is transmitted is limited based on a fraction α of the number of resource elements available for the transmission.

The apparatus may include additional components that perform each of the blocks of the algorithm in the aforementioned call flow diagram of FIG. 4 and/or the aforementioned flowchart of FIG. 5. As such, each block in the aforementioned call flow diagram of FIG. 4 and/or the aforementioned flowchart of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 602, and in particular the cellular baseband processor 604, includes means for means for determining a first MCS for control information based on spectral efficiency associated with transmission of data; and means for transmitting the control information with the first MCS, the control information being multiplexed with data.

In one configuration, the apparatus 602, and in particular the cellular baseband processor 604, includes means for determining the spectral efficiency associated with the transmission of data based on one or more of a number of information bits, a number of resource elements to be used for the transmission of the data multiplexed with the control information, a total number of resource elements available for the transmission, or a modulation order associated with the transmission.

In one configuration, a number of resource elements on which the control information is transmitted is limited based on a fraction α of the number of resource elements available for the transmission. In one configuration, the first MCS is determined based on one or more of an upper limit on a maximum coding rate, a modulation order, or a number of information bits associated with the transmission.

In one configuration, the apparatus 602, and in particular the cellular baseband processor 604, includes means for determining the offset β, and the determination of the first MCS is based on an offset β. In one configuration, the offset β is preconfigured in memory of the apparatus 602. In one configuration, the offset β is determined based on at least one of a type of the data multiplexed with the control information for the transmission, a priority of the data, or a QoS parameter associated with the data.

In one configuration, the apparatus 602, and in particular the cellular baseband processor 604, includes means for determining at least one of an upper bound or a lower bound associated with the offset β based on a configuration, and the offset β is determined to be inclusively within the at least one of the upper bound or the lower bound.

In one configuration, the first MCS is determined based on at least one of information indicating correspondence between the spectral efficiency and the first MCS, a type of the data multiplexed with the control information for the transmission, a priority of the data, a QoS parameter associated with the data, or a second MCS with which the data is transmitted.

In one configuration, the first MCS is different from a second MCS with which the data is transmitted. In one configuration, a modulation order associated with the first MCS is fixed to QPSK.

The aforementioned means may be one or more of the aforementioned components of the apparatus 602 configured to perform the functions recited by the aforementioned means. As described supra, the apparatus 602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), the method comprising:
   determining a spectral efficiency associated with transmission of data based on a number of information bits associated with control information, a number of resource elements to be used for the transmission of the data multiplexed with the control information, and a modulation order associated with the transmission;
   determining a first modulation and coding scheme (MCS) for control information on a sidelink channel based on the spectral efficiency associated with transmission of data on the sidelink channel and an offset $\beta$, wherein the offset $\beta$ is used to determine a number of modulated symbols used for transmission of the control information when control information is multiplexed with data, wherein a modulation order associated with the first MCS is fixed to quadrature-phase shift keying (QPSK); and
   transmitting, on the sidelink channel, the control information with the first MCS, the control information being multiplexed with data.

2. The method of claim 1, further comprising:
   determining the spectral efficiency associated with the transmission of data based on a total number of resource elements available for the transmission.

3. The method of claim 2, wherein the number of resource elements on which the control information is transmitted is limited based on a fraction of the number of resource elements available for the transmission.

4. The method of claim 1, wherein the first MCS is further determined based on a number of information bits associated with the transmission.

5. The method of claim 1, wherein the determination of the first MCS is based on the offset $\beta$.

6. The method of claim 5, wherein the offset $\beta$ is preconfigured in memory of the UE.

7. The method of claim 5, further comprising: determining the offset $\beta$.

8. The method of claim 7, wherein the offset $\beta$ is determined based on at least one of a type of the data multiplexed with the control information for the transmission, a priority of the data, or a quality of service (QOS) parameter associated with the data.

9. The method of claim 7, further comprising:
   determining at least one of an upper bound or a lower bound associated with the offset $\beta$ based on a configuration,
   wherein the offset $\beta$ is determined to be inclusively within the at least one of the upper bound or the lower bound.

10. The method of claim 1, wherein the first MCS is determined based on at least one of information indicating correspondence between the spectral efficiency and the first MCS, a type of the data multiplexed with the control information for the transmission, a priority of the data, a quality of service (QOS) parameter associated with the data, or a second MCS with which the data is transmitted.

11. The method of claim 1, wherein the first MCS is different from a second MCS with which the data is transmitted.

12. The method of claim 1, wherein the modulation order associated with the first MCS is fixed to quadrature-phase shift keying (QPSK) based on the modulation order being 2.

13. An apparatus for wireless communication by a user equipment (UE), the apparatus comprising:
    a memory; and
    at least one processor coupled to the memory and configured to:
       determining a spectral efficiency associated with transmission of data based on a number of information bits associated with control information, a number of resource elements to be used for the transmission of the data multiplexed with the control information, and a modulation order associated with the transmission;
       determine a first modulation and coding scheme (MCS) for control information on a sidelink channel based on the spectral efficiency associated with transmission of data on the sidelink channel and an offset $\beta$, wherein the offset $\beta$ is used to determine a number of modulated symbols used for transmission of the control information when control information is multiplexed with data, wherein a modulation order associated with the first MCS is fixed to quadrature-phase shift keying (QPSK); and
       transmit, on the sidelink channel, the control information with the first MCS, the control information being multiplexed with data.

14. The apparatus of claim 13, wherein the at least one processor is further configured to:
    determine the spectral efficiency associated with the transmission of data based on a total number of resource elements available for the transmission.

15. The apparatus of claim 14, wherein a number of resource elements on which the control information is transmitted is limited based on a fraction of the number of resource elements available for the transmission.

16. The apparatus of claim 13, wherein the first MCS is further determined based on a number of information bits associated with the transmission.

17. The apparatus of claim 13, wherein the determination of the first MCS is based on the offset $\beta$.

18. The apparatus of claim 17, wherein the offset $\beta$ is preconfigured in memory of the UE.

19. The apparatus of claim 17, wherein the at least one processor is further configured to:
    determine the offset $\beta$.

20. The apparatus of claim 19, wherein the offset $\beta$ is determined based on at least one of a type of the data multiplexed with the control information for the transmission, a priority of the data, or a quality of service (QOS) parameter associated with the data.

21. The apparatus of claim 19, wherein the at least one processor is further configured to:
    determine at least one of an upper bound or a lower bound associated with the offset $\beta$ based on a configuration,
    wherein the offset $\beta$ is determined to be inclusively within the at least one of the upper bound or the lower bound.

22. The apparatus of claim 13, wherein the first MCS is determined based on at least one of information indicating correspondence between the spectral efficiency and the first MCS, a type of the data multiplexed with the control information for the transmission, a priority of the data, a quality of service (QOS) parameter associated with the data, or a second MCS with which the data is transmitted.

23. The apparatus of claim 13, wherein the first MCS is different from a second MCS with which the data is transmitted.

24. The apparatus of claim 13, wherein the modulation order associated with the first MCS is fixed to quadrature-phase shift keying (QPSK) based on the modulation order being 2.

25. An apparatus for wireless communication by a user equipment (UE), the apparatus comprising:
means for determining a spectral efficiency associated with transmission of data based on a number of information bits associated with control information, a number of resource elements to be used for the transmission of the data multiplexed with the control information, and a modulation order associated with the transmission;
means for determining a first modulation and coding scheme (MCS) for control information on a sidelink channel based on the spectral efficiency associated with transmission of data on the sidelink channel and an offset $\beta$, wherein the offset $\beta$ is used to determine a number of modulated symbols used for transmission of the control information when control information is multiplexed with data, wherein a modulation order associated with the first MCS is fixed to quadrature-phase shift keying (QPSK); and
means for transmitting, on the sidelink channel, the control information with the first MCS, the control information being multiplexed with data.

26. The apparatus of claim 25, further comprising:
means for determining the spectral efficiency associated with the transmission of data based on a total number of resource elements available for the transmission.

27. The apparatus of claim 26, wherein a number of resource elements on which the control information is transmitted is limited based on a fraction of the number of resource elements available for the transmission.

28. The apparatus of claim 25, wherein the first MCS is determined based on a number of information bits associated with the transmission.

29. The apparatus of claim 25, further comprising:
means for determining the offset $\beta$,
wherein the determination of the first MCS is based on the offset $\beta$.

30. A non-transitory, computer-readable medium storing computer executable code, the code when executed by a processor cause the processor to:
determine a spectral efficiency associated with transmission of data based on a number of information bits associated with control information, a number of resource elements to be used for the transmission of the data multiplexed with the control information, and a modulation order associated with the transmission, wherein the spectral efficiency associated with the control information is derived on an inverse of an offset;
determine a first modulation and coding scheme (MCS) for control information on a sidelink channel based on the spectral efficiency associated with transmission of data on the sidelink channel and an offset $\beta$, wherein the offset $\beta$ is a used to determine a number of modulated symbols used for transmission of the control information when control information is multiplexed with data, wherein a modulation order associated with the first MCS is fixed to quadrature-phase shift keying (QPSK); and
transmit, on the sidelink channel, the control information with the first MCS, the control information being multiplexed with data.

* * * * *